United States Patent
Hayes

(10) Patent No.: US 8,204,926 B2
(45) Date of Patent: Jun. 19, 2012

(54) RELIABLE AND EFFICIENT COMPUTATION OF MODAL INTERVAL ARITHMETIC OPERATIONS

(75) Inventor: Nathan T. Hayes, Minneapolis, MN (US)

(73) Assignee: Sunfish Studio, LLC, Minneapolis, MN (US)

( * ) Notice: Subject to any disclaimer, the term of this patent is extended or adjusted under 35 U.S.C. 154(b) by 1061 days.

(21) Appl. No.: 12/088,374

(22) PCT Filed: Oct. 2, 2006

(86) PCT No.: PCT/US2006/038578
§ 371 (c)(1),
(2), (4) Date: Mar. 27, 2008

(87) PCT Pub. No.: WO2007/041560
PCT Pub. Date: Apr. 12, 2007

(65) Prior Publication Data
US 2008/0256156 A1    Oct. 16, 2008

Related U.S. Application Data

(60) Provisional application No. 60/723,059, filed on Oct. 3, 2005, provisional application No. 60/723,249, filed on Oct. 3, 2005.

(51) Int. Cl.
*G06F 7/483*    (2006.01)
(52) U.S. Cl. ...................................... 708/490

(58) Field of Classification Search .................. None
See application file for complete search history.

(56) References Cited

U.S. PATENT DOCUMENTS

| | | | |
|---|---|---|---|
| 6,629,120 B1 * | 9/2003 | Walster et al. | 708/620 |
| 6,658,443 B1 * | 12/2003 | Walster | 708/495 |
| 6,779,006 B1 * | 8/2004 | Walster et al. | 708/200 |
| 6,842,764 B2 * | 1/2005 | Walster | 708/207 |
| 7,069,288 B2 * | 6/2006 | Steele, Jr. | 708/495 |
| 7,219,117 B2 * | 5/2007 | Steele, Jr. | 708/495 |
| 7,222,146 B2 * | 5/2007 | Walster et al. | 708/496 |
| 7,831,652 B2 * | 11/2010 | Steele, Jr. | 708/503 |
| 7,949,700 B2 * | 5/2011 | Hayes | 708/490 |

* cited by examiner

*Primary Examiner* — David H Malzahn
(74) *Attorney, Agent, or Firm* — Nawrocki, Rooney & Sivertson, P.A.

(57) ABSTRACT

A computer executable method of performing a modal interval operation, and system for performing same is provided. The method includes providing representations of first and second modal interval operands. Each modal interval operand of the operands is delimited by first and second marks of a digital scale, each mark of the marks comprises a bit-pattern. Each bit-pattern of the bit-patterns of the marks of each of the modal interval operands are examined, and conditions of a set of status flags corresponding to each bit-pattern of the bit-patterns of the marks are set. A bit-mask is computed wherein the mask is based upon the set condition of the status flag sets and a presence/absence of an exceptional arithmetic condition, and a presence/absence of an indefinite operand are each represented by a bit of said bits of said bit mask.

9 Claims, 18 Drawing Sheets

CONDITIONS OF A MASK-DRIVEN MODAL INTERVAL ARITHMETICAL OPERATION

| 5 | 4 | 3 | 2 | 1 | 0 | CONDITION |
|---|---|---|---|---|---|---|
| 0 | 0 | - | - | - | - | unexceptional |
| 0 | 1 | - | - | - | - | exceptional |
| 1 | 0 | - | - | - | - | indefinite |
| 1 | 1 | - | - | - | - | indefinite |

FIG. 7

MASK-DRIVEN MODAL INTERVAL MULTIPLICATION

| 3 | 2 | 1 | 0 | Z1 | Z2 |
|---|---|---|---|---|---|
| 0 | 0 | 0 | 0 | $\downarrow(X1 \cdot Y1)$ | $\uparrow(X2 \cdot Y2)$ |
| 0 | 0 | 0 | 1 | $\downarrow(X1 \cdot Y1)$ | $\uparrow(X1 \cdot Y2)$ |
| 0 | 0 | 1 | 0 | $\downarrow(X2 \cdot Y1)$ | $\uparrow(X2 \cdot Y2)$ |
| 0 | 0 | 1 | 1 | $\downarrow(X2 \cdot Y1)$ | $\uparrow(X1 \cdot Y2)$ |
| 0 | 1 | 0 | 0 | $\downarrow(X1 \cdot Y1)$ | $\uparrow(X2 \cdot Y1)$ |
| 0 | 1 | 0 | 1 | $\max(\downarrow(X2 \cdot Y2), \downarrow(X1 \cdot Y1))$ | $\min(\uparrow(X2 \cdot Y1), \uparrow(X1 \cdot Y2))$ |
| 0 | 1 | 1 | 0 | $+0$ | $-0$ |
| 0 | 1 | 1 | 1 | $\downarrow(X2 \cdot Y2)$ | $\uparrow(X1 \cdot Y2)$ |
| 1 | 0 | 0 | 0 | $\downarrow(X1 \cdot Y2)$ | $\uparrow(X2 \cdot Y2)$ |
| 1 | 0 | 0 | 1 | $-0$ | $+0$ |
| 1 | 0 | 1 | 0 | $\min(\downarrow(X1 \cdot Y2), \downarrow(X2 \cdot Y1))$ | $\max(\uparrow(X1 \cdot Y1), \uparrow(X2 \cdot Y2))$ |
| 1 | 0 | 1 | 1 | $\downarrow(X2 \cdot Y1)$ | $\uparrow(X1 \cdot Y1)$ |
| 1 | 1 | 0 | 0 | $\downarrow(X1 \cdot Y2)$ | $\uparrow(X2 \cdot Y1)$ |
| 1 | 1 | 0 | 1 | $\downarrow(X2 \cdot Y2)$ | $\uparrow(X2 \cdot Y1)$ |
| 1 | 1 | 1 | 0 | $\downarrow(X1 \cdot Y2)$ | $\uparrow(X1 \cdot Y1)$ |
| 1 | 1 | 1 | 1 | $\downarrow(X2 \cdot Y2)$ | $\uparrow(X1 \cdot Y1)$ |

FIG. 8

MASK-DRIVEN MODAL INTERVAL DIVISION

| 3 | 2 | 1 | 0 | Z1 | Z2 |
|---|---|---|---|---|---|
| 0 | 0 | 0 | 0 | ↓(X1/Y2) | ↑(X2/Y1) |
| 0 | 0 | 0 | 1 | NaN | NaN |
| 0 | 0 | 1 | 0 | NaN | NaN |
| 0 | 0 | 1 | 1 | ↓(X2/Y2) | ↑(X1/Y1) |
| 0 | 1 | 0 | 0 | ↓(X1/Y2) | ↑(X2/Y2) |
| 0 | 1 | 0 | 1 | NaN | NaN |
| 0 | 1 | 1 | 0 | NaN | NaN |
| 0 | 1 | 1 | 1 | ↓(X2/Y1) | ↑(X1/Y1) |
| 1 | 0 | 0 | 0 | ↓(X1/Y1) | ↑(X2/Y1) |
| 1 | 0 | 0 | 1 | NaN | NaN |
| 1 | 0 | 1 | 0 | NaN | NaN |
| 1 | 0 | 1 | 1 | ↓(X2/Y2) | ↑(X1/Y2) |
| 1 | 1 | 0 | 0 | ↓(X1/Y1) | ↑(X2/Y2) |
| 1 | 1 | 0 | 1 | NaN | NaN |
| 1 | 1 | 1 | 0 | NaN | NaN |
| 1 | 1 | 1 | 1 | ↓(X2/Y1) | ↑(X1/Y2) |

FIG. 9

```
; SUBROUTINE: EXAM(X)
;
; This subroutine examines a 32-bit floating-point number X and
; stores the sign (S), NaN (N), infinity (I) and zero (Z) flags
; in the EAX register as follows:
;
;      bit:   24        16        8         0
;              |         |        |         |
;       0000000x0000000x0000000x0000000x
;              |         |        |         |
;     flag:    N         I        Z         S MOV     ECX, X              ; Move floating-point value X into ECX
XOR     EAX, EAX            ; Initialize EAX to all zeros BTR     ECX, 31             ; Clear sign bit and copy to carry flag
RCL     AL, 1               ; Rotate carry flag into S bit CMP     ECX, 0              ; Compare bits of ECX to zero
SETZ    AH                  ; Set Z bit if zero
CMP     ECX, 7F800000h      ; Compare bits of ECX to infinity
SETE    DL                  ; Set I bit if equal
SETA    DH                  ; Set N bit if above SHL     EDX, 16             ; Align N and I bits to proper position
OR      EAX, EDX            ; Merge N and I bits into EAX RET                         ; Return flags in EAX register
```

FIG. 14

```
; SUBROUTINE: MASKMUL(F0,F1,F2,F3)
;
; This subroutine computes a 6-bit mask for unbounded modal
; interval multiplication. The arguments F0, F1, F2 and F3 are
; each 32-bit integers representing the floating-point flags
; returned by EXAM(X1), EXAM(X2), EXAM(Y1) and EXAM(Y2),
; respectively, where X1, X2, Y1 and Y2 are the floating-point
; operands comprising two modal intervals. The 6-bit mask is
; returned in the EAX register.

; First, compute bits 0-3 of the mask by copying sign flags of
; F0, F1, F2 and F3 into EAX.

MOV     EAX, F0         ; Move F0 into EAX
MOV     ECX, F1         ; Move F1 into ECX
SHL     ECX, 1          ; Align F1 to bit 1
OR      EAX, ECX        ; Merge F1 flags into EAX
MOV     ECX, F2         ; Move F2 into ECX
SHL     ECX, 2          ; Align F2 to bit 2
OR      EAX, ECX        ; Merge F2 flags into EAX
MOV     ECX, F3         ; Move F3 into ECX
SHL     ECX, 3          ; Align F3 to bit 3
OR      EAX, ECX        ; Merge F3 flags into EAX
AND     EAX, 15         ; Clear all but bits 0-3

; Next, compute intermediate results used in the remainder of
; calculations performed in this subroutine.

MOV     ECX, F0         ; Move F0 into ECX
MOV     EDX, F2         ; Move F2 into EDX
OR      ECX, F1         ; Bitwise-OR of F0 and F1
OR      EDX, F3         ; Bitwise-OR of F2 and F3

PUSH    EBX             ; Be nice: save EBX register

; Compute bit 5 by considering the N flag of all operands.

MOV     EBX, ECX        ; Move copy of ECX into EBX
OR      EBX, EDX        ; Bitwise-OR EBX and EDX
SHR     EBX, 19         ; Align N flag to bit 5
AND     EBX, 32         ; Clear all but bit 5
OR      EAX, EBX        ; Merge bit 5 into EAX ; Compute bit 4 by considering the exceptional cases for
; unbounded multiplication.

MOV     EBX, ECX        ; Move copy of ECX into EBX
SHL     ECX, 8          ; Align Z and I flags
AND     ECX, EDX        ; Bitwise-AND ECX and EDX
SHL     EDX, 8          ; Align Z and I flags
AND     EDX, EBX        ; Bitwise-AND EDX and EBX
OR      ECX, EDX        ; Bitwise-OR ECX and EDX
SHR     ECX, 12         ; ALign I flag to bit 4
AND     ECX, 16         ; Clear all but bit 4
OR      EAX, ECX        ; Merge bit 4 into EAX POP     EBX             ; Restore clobbered register RET                     ; Return 6-bit mask in EAX
```

FIG. 15

```
; SUBROUTINE: MASKDIV(F0,F1,F2,F3)
;
; This subroutine computes a 6-bit mask for unbounded modal
; interval division. The arguments F0, F1, F2 and F3 are each
; 32-bit integers representing the floating-point flags returned
; by EXAM(X1), EXAM(X2), EXAM(Y1) and EXAM(Y2), respectively,
; where X1, X2, Y1 and Y2 are the floating-point operands
; comprising two modal intervals. The 6-bit mask is returned
; in the EAX register.

; First, compute bits 0-3 of the mask by copying sign flags of
; F0, F1, F2 and F3 into EAX.

MOV     EAX, F0         ; Move F0 into EAX
MOV     ECX, F1         ; Move F1 into ECX
SHL     ECX, 1          ; Align F1 to bit 1
OR      EAX, ECX        ; Merge F1 flags into EAX
MOV     ECX, F2         ; Move F2 into ECX
SHL     ECX, 2          ; Align F2 to bit 2
OR      EAX, ECX        ; Merge F2 flags into EAX
MOV     ECX, F3         ; Move F3 into ECX
SHL     ECX, 3          ; Align F3 to bit 3
OR      EAX, ECX        ; Merge F3 flags into EAX
AND     EAX, 15         ; Clear all but bits 0-3

; Next, compute intermediate results used in the remainder of
; calculations performed in this subroutine.

MOV     ECX, F0         ; Move F0 into ECX
MOV     EDX, F2         ; Move F2 into EDX
OR      ECX, F1         ; Bitwise-OR of F0 and F1
OR      EDX, F3         ; Bitwise-OR of F2 and F3

PUSH    EBX             ; Be nice: save EBX register

; To compute bit 5, first consider the N flag of all operands.

MOV     EBX, ECX        ; Move copy of ECX into EBX
OR      EBX, EDX        ; Bitwise-OR EBX and EDX
SHR     EBX, 19         ; Align N flag to bit 5
AND     EBX, 32         ; Clear all but bit 5
OR      EAX, EBX        ; Merge bit 5 into EAX ; To finish bit 5, check for the presence of zero in the
; denominator and update the state of bit 5.

MOV     EBX, EDX        ; Move copy of EDX into EBX
SHR     EBX, 3          ; Align Z flag to bit 5
AND     EBX, 32         ; Clear all but bit 5
OR      EAX, EBX        ; Merge bit 5 into EAX POP     EBX             ; Restore clobbered register ; Bit 5 is now complete. Consider next the special cases for
; unbounded division and the state of bit 4.

AND     ECX, EDX        ; Bitwise-AND ECX and EDX
SHR     ECX, 12         ; Align I flag to bit 4
AND     ECX, 16         ; Clear all but bit 4
OR      EAX, ECX        ; Merge bit 4 into EAX RET                     ; Return 6-bit mask in EAX
```

FIG. 16

RELIABLE AND EFFICIENT COMPUTATION OF MODAL INTERVAL ARITHMETIC OPERATIONS

This is an international application filed under 35 USC §363 claiming priority under 35 U.S.C. §119(e)(1), of U.S. provisional application Ser. Nos. 60/723,059 and 60/723,249, each having a filing date of Oct. 3, 2005, said applications incorporated herein by reference in their entireties.

TECHNICAL FIELD

The present invention generally relates to methods associated with the execution of arithmetic operations on modal intervals within a computing/processing environment, more particularly, the present invention relates to a system and method of performing a modal interval arithmetic operation that is both mathematically reliable and computationally efficient.

BACKGROUND OF THE INVENTION

The common and popular notion of interval arithmetic is based on the fundamental premise that intervals are sets of numbers and that arithmetic operations can be performed on these sets. Such interpretation of interval arithmetic was initially advanced by Ramon Moore in 1957, and has been recently promoted and developed by interval researchers such as Eldon Hansen, William Walster, Guy Steele and Luc Jaulin. This is the so-called "classical" interval arithmetic, and it is purely set-theoretical in nature.

A set-theoretical interval is a compact set of real numbers [a,b] such that $a \leq b$. The classical interval arithmetic operations of addition, subtraction, multiplication and division combine two interval operands to produce an interval result such that every arithmetical combination of numbers belonging to the operands is contained in the interval result. This leads to programming formulas made famous by classical interval analysis, and which are discussed at length in the interval literature.

Translating interval programming formulas into practical computational methods that can be performed within a computer remains a topic of research in the interval community. The Institute of Electrical and Electronics Engineers Standard for Binary Floating-Point Arithmetic (i.e., IEEE standard 754), which specifies exceptionally particular semantics for binary floating-point arithmetic, enjoys pervasive and worldwide use in modern computer hardware. As a result, efforts have been focused on creating practical interval arithmetic implementations that build on the reputation and legacy of this standard.

Creating practical implementations, however, is not without its perils. The problems begin with choosing a suitable representation in a computer for the intervals. An obvious choice is to use two floating-point numbers to represent the endpoints of an interval. What is not obvious is how to handle complications which arise in conditions such as overflow, underflow and exceptional combinations of operands.

IEEE standard 754 specifies bit-patterns to represent real floating-point numbers as well as $-\infty$, $+\infty$, $-0$, $+0$ and the pseudo-numbers, which are called NaNs (i.e., Not-a-Number). Although the standard defines precise rules for the arithmetical combination of all permutations of bit-patterns of two floating-point values, the translation of these rules into arithmetical combinations of intervals is unclear. As is widely held, mapping the interval endpoints onto the set of IEEE floating-point representations is both desirable and challenging.

With great debate, and various levels of success, set-theoretical interval researchers have developed different representation methods for intervals. In the paper "Interval Arithmetic: from Principles to Implementation," Hickey, et. al., Journal of the ACM, Vol. 48.5, 2001, p. 1038-1068, incorporated herein by references, the authors discuss and summarize the many different implementations and viewpoints of the interval community on this subject. In another example, Walster defines a sophisticated mapping of set-theoretical intervals to IEEE standard 754 in U.S. Pat. No. 6,658,443, which is also incorporated herein by reference.

Consensus in the interval community remains divided. As an example, the methods of both Walster and Hickey require special treatment of $-0$ and $+0$ as distinct values. However, others, like Jorge Stolfi, reject such special treatments of $-0$, and generally comment that while it is possible to concoct examples where such special treatment saves an instruction or two, in the vast majority of applications doing so is an annoying distraction, and a source of subtle bugs.

This observation is closely related to a problem that plagues representations of intervals in the prior art: a lack of closure or completeness. Such representations do not specify semantics for all possible bit-patterns of intervals represented by the set of IEEE floating-point numbers.

For example, in the 1997 monograph "Self-Validated Numerical Methods and Applications," Stolfi describes a system and method for representing set-theoretical intervals within a computer, but not all possible bit-patterns are accounted for. The computational programs therein assume such bit-patterns will not appear as an operand. If the user does not take great care to submit only the valid subset of operands to the computational program, unreliable results are the inevitable and unfortunate consequence.

The same problem or shortcoming is found in the representations of Walster and Hickey. In both cases, true mathematical zero must be represented as the interval $[-0,+0]$. By construction, the intervals $$[-0, -0]$$
$$[+0, +0]$$
$$[+0, -0]$$

are invalid and have no semantical meaning. If great care is not taken to ensure these intervals do not appear in a computation, unreliable results occur.

Similarly, semantics do not exist, or are unclear for some intervals involving infinities. As an example, Walster's method is ambiguous on the treatment of the intervals $$[-\infty, -\infty]$$
$$[+\infty, +\infty],$$

whereas Stolfi unequivocally identifies such intervals as invalid.

Last but hardly least, computational simplicity is another goal that has so far been elusive. For example, the method of Walster requires significant amounts of special software instruction to create an implementation that works properly with existing hardware, with such requirement no doubt an obstacle to creating a practical implementation and/or commercial product embodying same.

In 2001, Miguel Sainz and other members of the SIGLA/X group at the University of Girona, Spain, introduced a new branch of interval mathematics known as "modal intervals." Unlike the classical view of an interval as a compact set of real numbers, the new modal mathematics considers an interval to be a quantified set of real numbers.

As a practical consequence, a modal interval is comprised of a binary quantifier and a set-theoretical interval. In the modal interval literature, an apostrophe is used to distinguish a set-theoretical interval from a modal interval, so if Q is a quantifier and X' is a purely set-theoretical interval, then X=(Q, X') is a modal interval. For this reason, it is easy to see that modal intervals are a true superset of the classical set-theoretical intervals. At the same time, the quantified nature of a modal interval provides an extra dimension of symmetry not present in the classical set-theoretical framework.

This difference allows the modal intervals to solve problems out of the reach of their classical counterparts. Just as the real expression 3+x=0 has no meaning without negative numbers, it can be shown that the interval expression [1,2]+X [0,0] has no meaning without quantified (i.e., modal) intervals.

The quantified nature of a modal interval comes from predicate logic, and the value of a quantifier may be one of the fundamental constructions $\exists$ or $\forall$, that is, "existential" or "universal." The symbols $\exists$ and $\forall$ are commonly read or interpreted as "there exists" and "for all," respectively.

The article "Modal Intervals," M. Sainz, et. al., Reliable Computing, Vol. 7.2, 2001, pp. 77-111, provides an in-depth introduction to the notion of modal intervals, how they differ from the classical set-theoretical intervals, and upon what mathematical framework they operate; the article is also incorporated herein by reference.

Considering that modal intervals are a new mathematical construct, a new and improved set of arithmetical operations is needed. The large body of work dealing with arithmetical operations on set-theoretical intervals is largely unhelpful due to the fact that modal intervals are mathematically more complex.

A software program for modal intervals available from the University of Girona provides a starting point or benchmark. The designers of that system avoid several implementation complexities by limiting modal intervals to those comprised only of finite and bounded endpoints. Such a representation is relatively simple to implement in a computer, but it lacks reliable overflow tracking, which can lead to pessimism and even unreliable results. This is particularly true when computations are performed in a mixed-mode environment, that is, when calculations on numbers represented by different digital scales are mixed within a lengthy computation. This occurs, for example, when some intervals in a computation are represented by 32-bit floating-point values while others have 64-bit representations.

For this reason, the previously discussed pitfalls which plague the set-theoretical operations apply to modal intervals. When considering a set of improved arithmetical operations for modal intervals, there is also the burden of supporting mathematical semantics required by modal intervals which are not present in a set-theoretical interval system, or vice-versa. Hickey defines [0,1]/[0,1]=[0,+∞] as a valid example of an expression which represents the division of two set-theoretical intervals containing zero. Such semantics do not exist in the context of modal intervals and are therefore unsuitable for, and hardly compatible with, a modal interval operation.

More recently, invalid operations of IEEE arithmetic in relation to the classical set-theoretical interval arithmetic have been addressed by Steele, Jr. in U.S. Pat. No. 7,069,288, incorporated herein by reference. In-as-much as improved results are arguably provided, the improved result values are not compatible with an unbounded modal interval framework, more particularly, Steele does not consider existential or universal quantifiers. Furthermore, and also of significance, the improved results identified by Steele depend on a rounding mode. For example, Steele defines $$(+\infty)+(-\infty)=+\infty$$

when rounding towards positive infinity and $$(+\infty)+(-\infty)=-\infty$$

when rounding in the opposite direction.

The focus of the present invention is the reliable and efficient computation of modal interval arithmetic operations. By definition, this includes modal interval addition, subtraction, multiplication and division.

In the case of the present invention, an implementation is "reliable" if it generates a mathematically correct result for any combination of operands; and the implementation is "efficient" if it requires minimal computational effort.

The prior art is filled with examples of implementations of arithmetical operations on set-theoretical intervals. Some of the examples are efficient, but none are completely reliable. In most cases, they are neither reliable nor efficient.

As a point of reference, Walster et al. describe a mask-driven division operation for set-theoretical intervals in U.S. Pat. No. 6,658,444, which is incorporated herein by reference. The basic idea of the disclosed method is to condense the complex branching logic required by the division operation into a mask, which can then be used as a switch to efficiently direct control of the software to the relevant case. Little attention is given, however, to the most crucial and important function: the actual creation of the mask. The disclosed methodology requires as much branching logic to compute the value of the mask as an implementation that is not mask-driven. As a result, the efficiency of such an implementation is questionable.

A further shortcoming of the disclosed methodology is that all cases of input are not properly considered. This can lead to unreliable computations for certain combinations of operands. As in Stolfi's "Self Validated Numerical Methods and Applications" monograph discussed earlier, Walster et al.'s method is similarly reliable only to the extent that great care is taken to submit a valid combination of operands to the division operation.

As an example, if the operands X=[+∞,+∞] and Y=[6,+∞] are submitted to Walster et al.'s TABLE 1 division operation, the operation will not properly detect the invalid IEEE arithmetic operation +∞/+∞ which occurs in the first endpoint of the result. Instead, the computational program will improperly create a mask representing case 10, and compute [+∞/+∞,+∞/6]=[NaN, +∞].

Similarly, if an invalid set-theoretical interval is submitted as an operand, Walster et al.'s TABLE 1 division operation will not detect the error in all cases. If X=[5,3] and Y=[6,9], a mask for case 10 is computed and the result [⅚,½] is returned. In this case, X is not a valid set-theoretical interval, nor is the result.

The methodology of Walster et al. is set primarily in the context of a software system which is under control of a compiler. As such, it is reasonable to assume that the compiler will do syntactical verification of the operands and detect such errors. But this is only true to the extent that the operands are compile-time constants in the original software source code. For example, if the operands to the interval division operation are input selectively by a user at runtime, then the compiler has no opportunity to detect that invalid operands are being submitted to the interval division operation. In such case, the inevitable result will be unreliable computations.

Similar shortcomings are likewise present in the mask-driven multiplication operation for set-theoretical intervals described in U.S. Pat. No. 6,629,120 (Walster et al.), incorporated herein by reference, as well as with the computational programs in Stolfi's previously cited monograph. The point to be made by all these examples is not to depreciate the work and contributions of prior artisans, but to illustrate the critical issue that remains: that computing reliable and efficient arithmetical operations on intervals is an exceptionally challenging problem, a problem yet to be solved.

SUMMARY OF THE INVENTION

The present invention provides a novel set of modal interval arithmetical operations that are both reliable and efficient. The preferred embodiment of each arithmetical operation in the present invention is an Arithmetic Functional Unit (AFU) of a modal interval processor, such as the processor described in applicant's pending international application ser. no. PCT/US06/12547 filed Apr. 5, 2006 entitled MODAL INTERVAL PROCESSOR, and incorporated herein by reference. Representations for modal intervals within a computer, consistent and/or compatible with the teaching associated with applicant's copending international application ser. no. PCT/US06/38579, entitled REPRESENTATION OF MODAL INTERVALS WITHIN A COMPUTER, filed Oct 2, 2006 and which is incorporated herein by reference, are utilized.

The AFU receives a representation of a first and a second modal interval, performs a modal interval arithmetical operation, and returns a modal interval result. To perform the arithmetic operation, the present invention examines the bit-pattern of each of the four numbers which represent the endpoints of the two modal interval operands. For each bit-pattern of each number, a corresponding S (sign), N (not-a-number), I (infinity), and Z (zero) flag is set to a state which characterizes the number.

Once each bit-pattern is examined, the signal of each S, N, I and Z flag of each number is processed by a series of logic gates to construct a 6-bit mask such that four consecutive bits in the mask represent an ordered arrangement of the signs of the four original numbers; that a fifth bit in the mask represents the presence or absence of an exceptional arithmetic condition; and that a sixth bit in the mask represents the presence or absence of an indefinite operand or division by zero.

The 6-bit mask is then used to transfer control of the arithmetic operation to one of several different cases. The number of cases depends on the arithmetical operation, but there always exists three general conditions of cases: unexceptional, exceptional, and indefinite.

An unexceptional condition occurs when the fifth and sixth bit of the 6-bit mask are zero. An exceptional condition occurs when the fifth bit is one and the sixth bit is zero. An indefinite condition occurs when the sixth bit is one, regardless of the fifth bit. For the exceptional conditions of a modal interval arithmetic operation, the S, I and Z flags of the original numbers are further processed by a second series of logic gates to further transfer control of the arithmetical operation to an appropriate handler.

In another embodiment of the present invention, special instruction is provided to a floating-point processor, thereby emulating the aforementioned function of the AFU circuit.

By combination of these parts and methods, the present invention produces, among other things, the following novelties: a closed mapping of modal interval arithmetical operations to IEEE standard 754; reliable and efficient arithmetical operations for modal intervals; reliable mixed-mode computing for modal intervals; complete support for arithmetical operations on unbounded modal intervals; and, reliable overflow tracking for arithmetical operations on modal intervals.

BRIEF DESCRIPTION OF THE DRAWINGS

FIG. 7 presents tabulated conditions for a mask-driven modal interval arithmetical operation;

FIG. 8 presents tabulated conditions for a mask-driven modal interval multiplication operation;

FIG. 9 presents tabulated conditions for a mask-driven modal interval division operation;

FIG. 14 is an illustrative example of code, i.e., a software program, which emulates the procedure depicted in FIG. 1;

FIG. 15 is an illustrative example of code, i.e., a software program which emulates the logic diagram depicted in FIG. 3;

FIG. 16 is an illustrative example of code, i.e., a software program which emulates the logic diagram depicted in FIG. 4;

DETAILED DESCRIPTION OF THE INVENTION

As a preliminary matter, there exists a relatedness and/or synergy between and among the subject invention and other inventions of applicant which are subject of one or more pending patent applications. The arithmetical operations of the present invention are advantageously embodied in an Arithmetic Functional Unit (AFU) of a modal interval processor or the like, more particularly, a modal interval processor as disclosed in applicant's copending, and previously cited application entitled MODAL INTERVAL PROCESSOR.

Throughout the subject disclosure, the term "mark" is intended to have the same definition as that provided in applicant's copending, and previously cited application entitled REPRESENTATION OF MODAL INTERVALS WITHIN A COMPUTER. Furthermore, the term mark is an alias for the term "set-theoretical number" as defined in applicant's copending, and previously cited application entitled MODAL INTERVAL PROCESSOR.

Classifying Numbers

The AFU in a modal interval processor generally receives a representation of a first and a second modal interval as operands. The AFU then performs a modal interval arithmetical operation on the operands and returns a modal interval result.

Figure 1:
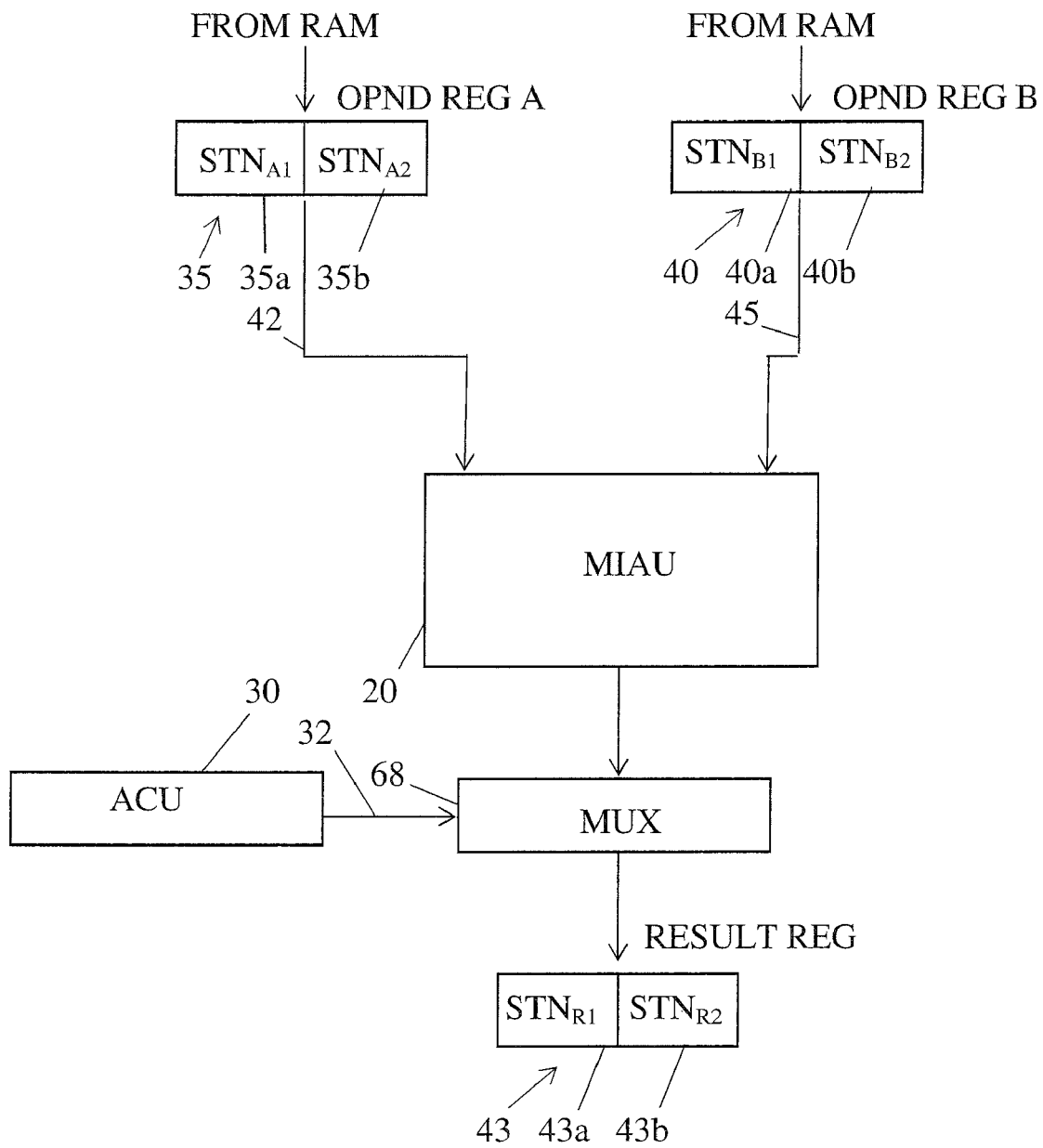
FIG. 1 is a block diagram of a logic circuit for computing a plurality of modal interval mathematical functions.

FIG. 1 shows first and second operand registers 35 and 40 having respectively a $STN_{A1}$ (i.e., multi-bit set theoretical number) portion 35a and $STN_{A2}$ portion 35b, and a $STN_{B1}$ portion 40a and $STN_{B2}$ portion 40b. Operand registers 35 and 40 provide operand signals on paths 42 and 45 respectively.

A modal interval (MI) arithmetic unit (MIAU) 20 receives the two operand signals from the operand registers 35 and 40. The MIAU 20 performs arithmetic operations on the MI operand(s) encoded in the signals of paths 42 and 45.

A multiplexer (MUX) 68 receives the output of MIAU 20 in a plurality of result signals from various arithmetic functional units (AFUs) within MAIU 20. A selector signal on a selector signal path 32 from arithmetic control unit (ACU) 30 is applied to multiplexer 68 causing multiplexer 68 to select the result signal from one of the AFUs within MAIU 20, which signal is transmitted to STN portions 43a and 43b of a result register 43 in a result signal. Of course, each of the operand registers 35 and 40 and the result register all record an MI value having the two STN values shown as well as in this case a quantifier value.

Figure 2:
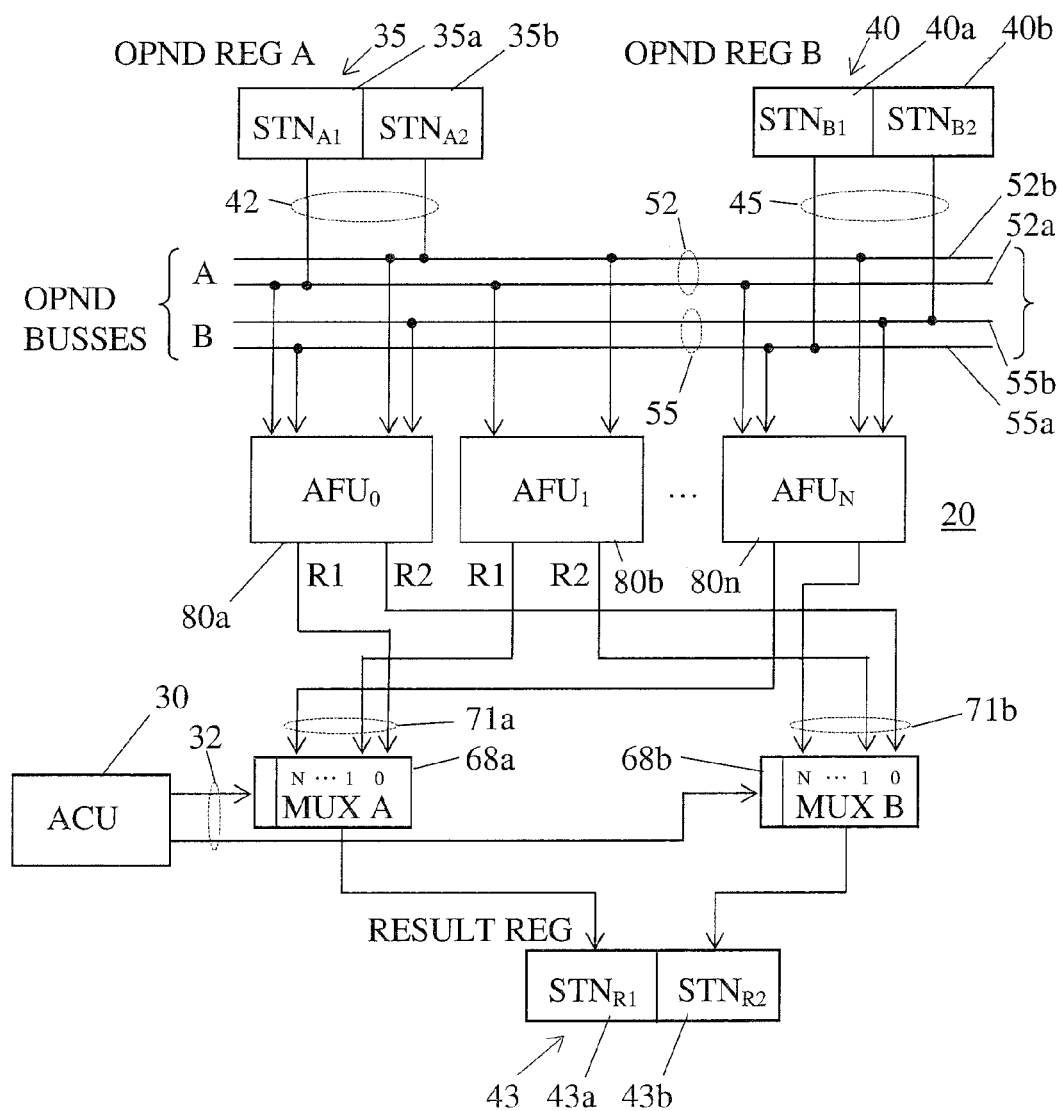
FIG. 2 shows a detailed block diagram of the logic diagram.

FIG. 2 shows the diagram of FIG. 1 in more detail. The values in the operand registers are applied to operand busses 52 and 55, which carry on individual STN paths 52a, 52b and 55a, 55b, the $STN_1$ and $STN_2$ values recorded in portions of operand registers A and B 35 and 40 respectively. Busses 52 and 55 distribute the individual $STN_{A1}$, $STN_{A2}$, $STN_{B1}$, and $STN_{B2}$ values to the various AFU elements 80a, 80b, and through 80n respectively. Some of the arithmetic functions computed may receive only a single operand. $AFU_1$ 80b is an example of such a unary arithmetic function, receiving only the $STN_{A1}$ and $STN_{A2}$ values.

$AFU_0$-$AFU_N$ 80a-80n receive operand signals on busses 52 and 55. Each of the $AFU_0$-$AFU_N$ 80a through 80n compute the assigned arithmetic function and supplies the result of that computation encoded in result signals for each of the STN result values R1 and R2 in the computed MI. Of course, the relative signed magnitudes encoded in the R1 and R2 values determine the quantification value of the MI provided by the particular AFU 80a, etc.

Multiplexer 68 comprises two separate multiplexer sections A and B, designated 68a and 68b, comprising multi-bit input ports 71a and 71b, respectively, each multiplexer section handling one of the two STN values R1 and R2. The R1 value from $AFU_0$ 80a is applied to port 0 input port 71a of section A 68a, the R2 value from $AFU_0$ 80a is applied to port 0 input port 71b of section B 68b, etc. ACU 30 provides a selector signal on path 32 that allows only the signal applied to a single one of the ports of each multiplexer section 68a and 68b to pass through to result register 43. For example, if the selector signal value is 0, then both input ports 0 of multiplexer sections 68a and 68b are activated to transmit the R1 and R2 values to result register 43.

To perform the operation, the present invention examines the bit-pattern of a first and a second mark which represent the endpoints of the first and second modal interval operands, respectively. For each bit-pattern of each mark, a set of status flags are set to a state which characterize the mark. The set of status flags is comprised of an S (sign), N (not-a-number), I (infinity), and Z (zero) flag.

In the preferred embodiment of the invention, the allocation of bits which represent a mark is specified by IEEE standard 754. Specifically, the bits of a mark are grouped into three fields: sign, exponent, and fraction. It is always the case that the sign field is comprised of a single bit. The exponent field is typically comprised of 8 or 11 bits, the fraction field being respectively comprised of 23 or 52 bits. Other allocations of bits are possible, and the present invention extends to and contemplates such cases.

IEEE standard 754 specifies that the magnitude of a mark is infinity if the exponent field is comprised of all ones and the fraction field is comprised of all zeros. Similarly, such a mark is a pseudo-number (i.e., NaN) if the exponent field is comprised of all ones, and the fraction field is comprised of any combination of ones and zeros such that all bits are not zero.

FIG. 1 represents a procedure to set the state of the status flags. First, the sign bit (S) of the mark is copied to the S flag. Next, the exponent (E) and fraction (F) fields of the mark are considered as a single unsigned integer, as a logical unit; the exponent field representing the highest-order bits of the unit. The Z flag is set to one (true) if all bits of the unit are zero; otherwise the Z flag is set to zero (false). The I flag is set to one (true) if all bits of the unit are equal to the bit-pattern of infinity; otherwise the I flag is set to zero (false). The N flag is set to one (true) if the magnitude of all bits in the unit are above (greater-than) the bit-pattern of infinity; otherwise the N flag is set to zero (false).

Creating a Mask

An AFU in a modal interval processor generally receives as operands a representation of a first modal interval X and a second modal interval Y. Operand X is comprised of a first mark X1 and a second mark X2, and operand Y is comprised of a first mark Y1 and a second mark Y2.

First, the AFU computes a proper state for an S, N, I and Z status flag that exists for each of the X1, X2, Y1 and Y2 marks. Then the AFU passes the signals of or associated with these states through a series of logic gates to compute a 6-bit mask.

The S flag of each X1, X2, Y1 and Y2 is copied into a consecutive and ordered arrangement within the mask to bit positions 3, 2, 1 and 0, respectively.

The mask at bit position 4 and 5 depends on the arithmetical operation, that is, each AFU has a different logic which is used to compute the final result of the mask at bit position 4 and 5.

FIG. 2 depicts the creation of a mask for addition and subtraction. The I flags of X1 and X2 pass through an OR gate to produce a first intermediate result. The I flags of Y1 and Y2 pass through an OR gate to produce a second intermediate result. The signals of the first and second intermediate results pass through an AND gate to produce a final result within the mask at bit position 4. The N flag of each X1, X2, Y1 and Y2 pass through a four-way OR gate to produce a final result within the mask at bit position 5.

Figure 3:
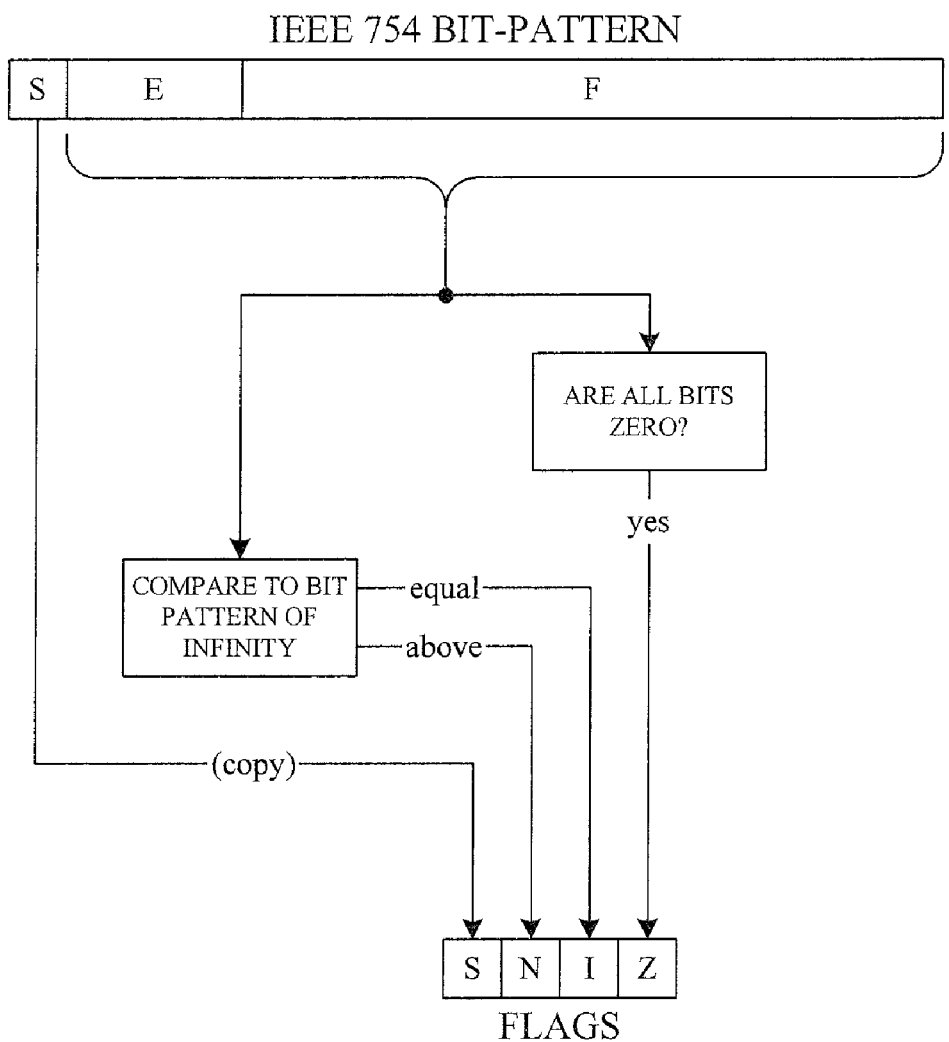
FIG. 3 schematically depicts a procedure to set the status or status flags which characterize a floating-point number.

FIG. 3 depicts the creation of a mask for multiplication. The I flags of X1 and X2 pass through an OR gate to produce a first intermediate result. The Z flags of Y1 and Y2 pass through an OR gate to produce a second intermediate result. The signals of the first and second intermediate results pass through an AND gate to produce a third intermediate result. The I flags of Y1 and Y2 pass through an OR gate to produce a fourth intermediate result. The Z flags of X1 and X2 pass through an OR gate to produce a fifth intermediate result. The signals of the fourth and fifth intermediate results pass through an AND gate to produce a sixth intermediate result.

The signals of the third and sixth intermediate results pass through an OR gate to produce a final result within the mask at bit position 4. The N flag of each X1, X2, Y1 and Y2 pass through a four-way OR gate to product a final result within the mask at bit position 5.

Figure 4:
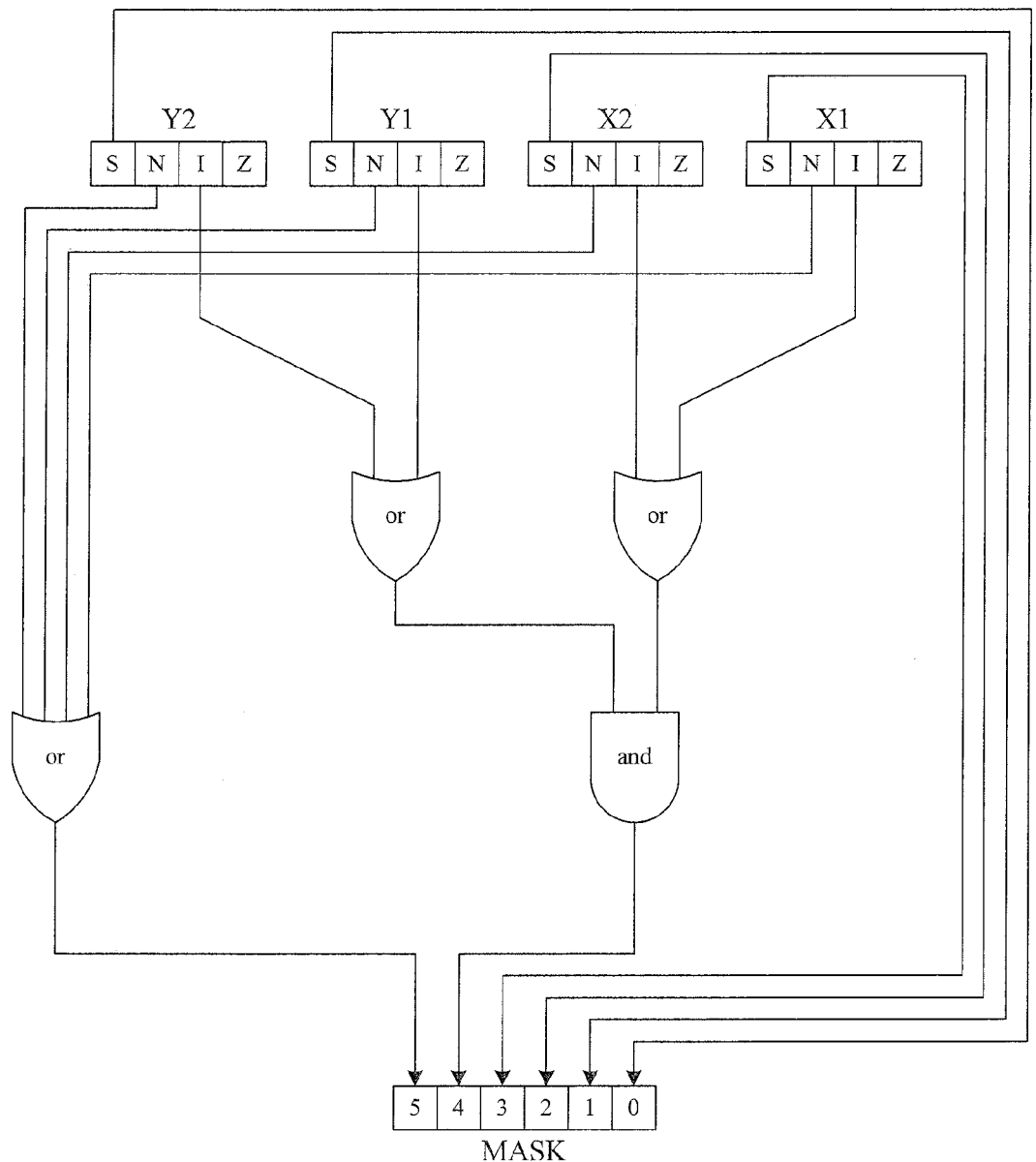
FIG. 4 depicts logic operations in furtherance of computing a 6-bit mask for modal interval addition and subtraction.

FIG. 4 depicts the creation of a mask for division. The I flags of X1 and X2 pass through an OR gate to produce a first intermediate result. The I flags of Y1 and Y2 pass through an OR gate to produce a second intermediate result. The signals of the first and second intermediate results pass through an AND gate to produce a final result within the mask at bit position 4. The Z flags of Y1 and Y2 pass through an OR gate to produce a third intermediate result. The N flag of each X1, X2, Y1 and Y2 pass through a four-way OR gate to produce a fourth intermediate result. The signals of the third and fourth intermediate results pass through an OR gate to produce a final result within the mask at bit position 5.

By combination of these parts and methods, the present invention creates a 6-bit mask for modal interval addition, subtraction, multiplication and division such that bits 0 to 3 represent an ordered arrangement of the signs of the marks X1, X2, Y1 and Y2; that bit 4 represents the presence (one) or absence (zero) of an exceptional arithmetic condition; and that bit 5 represents the presence (one) or absence (zero) of an indefinite operand or division by zero.

Figure 5:
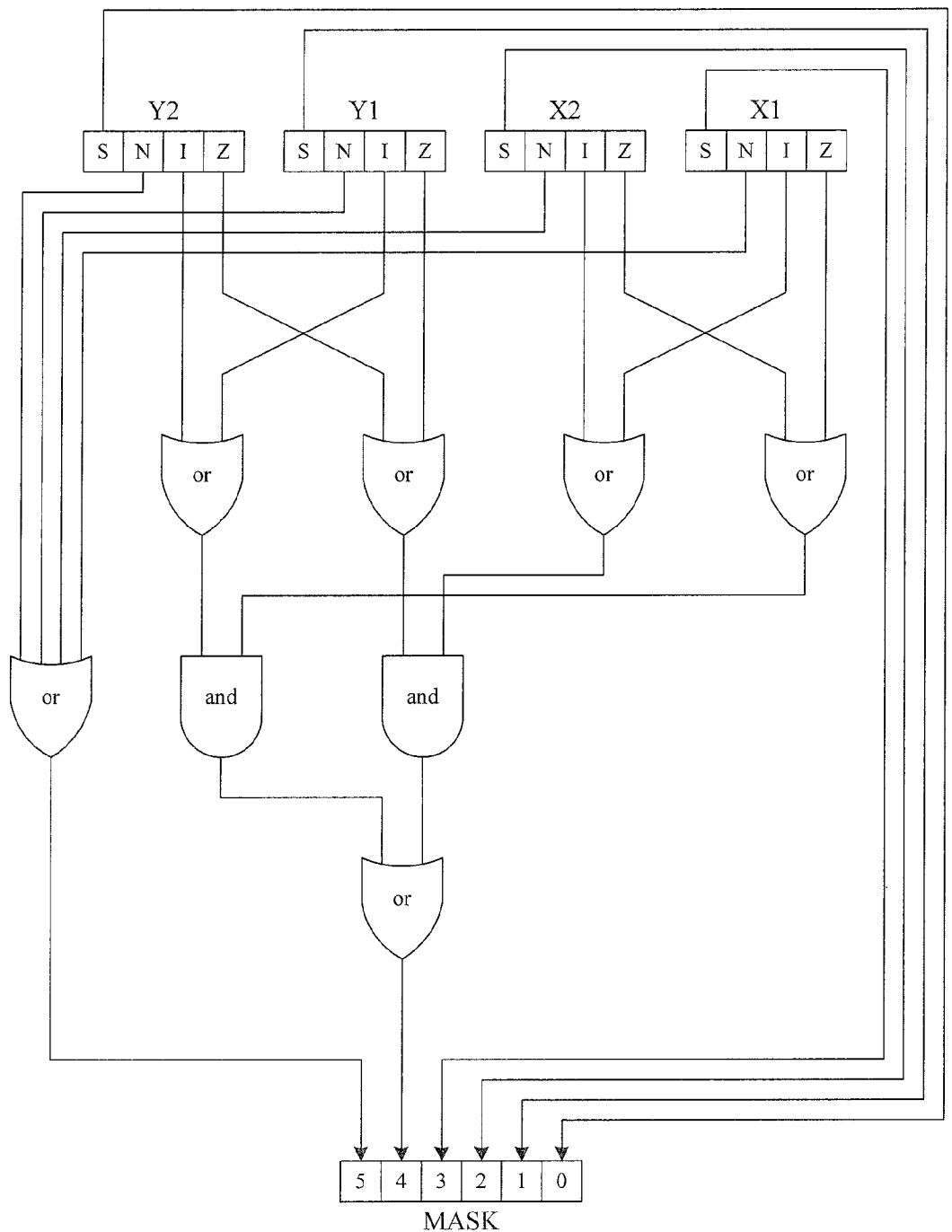
FIG. 5 depicts logic operations in furtherance of computing a 6-bit mask for modal interval multiplication.

The 6-bit mask is then used to transfer control of the arithmetic operation to one of several different cases. The number of cases depends on the arithmetical operation, but there always exists three general conditions of cases: unexceptional, exceptional, and indefinite, see generally FIG. 5. An unexceptional condition occurs when bits 4 and 5 are zero. An exceptional condition occurs when bit 4 is one and bit 5 is zero. An indefinite condition occurs when bit 5 is one, regardless of bit 4.

Unexceptional Condition

If bits 4 and 5 are zero, an unexceptional arithmetical operation occurs; the ordered arrangement of bits 0 to 3 forms a binary representation of a number which represents one of a sixteen possible cases of the unexceptional arithmetical operation.

For each unexceptional case, a modal interval result comprised of a first mark, Z1, and a second mark, Z2, is defined. If an arithmetic operation is performed to compute Z1, the exact result of the arithmetic operation is rounded towards negative infinity; if an arithmetic operation is performed to compute Z2, the exact result of the arithmetic operation is rounded towards positive infinity.

The symbols "↓" and "↑" are used to represent a rounding of an exact arithmetical result to the nearest mark towards negative and positive infinity, respectively.

For modal interval addition, the computation of Z1 and Z2 does not depend on bits 0 to 3. In all cases, Z1 is the result of arithmetic operation ↓(X1+Y1) and Z2 is the result of arithmetic operation ↑(X2+Y2).

For modal interval subtraction, the computation of Z1 and Z2 does not depend on bits 0 to 3. In all cases, Z1 is the result of arithmetic operation ↓(X1−Y2) and Z2 is the result of arithmetic operation ↑(X2−Y1).

Figure 6:
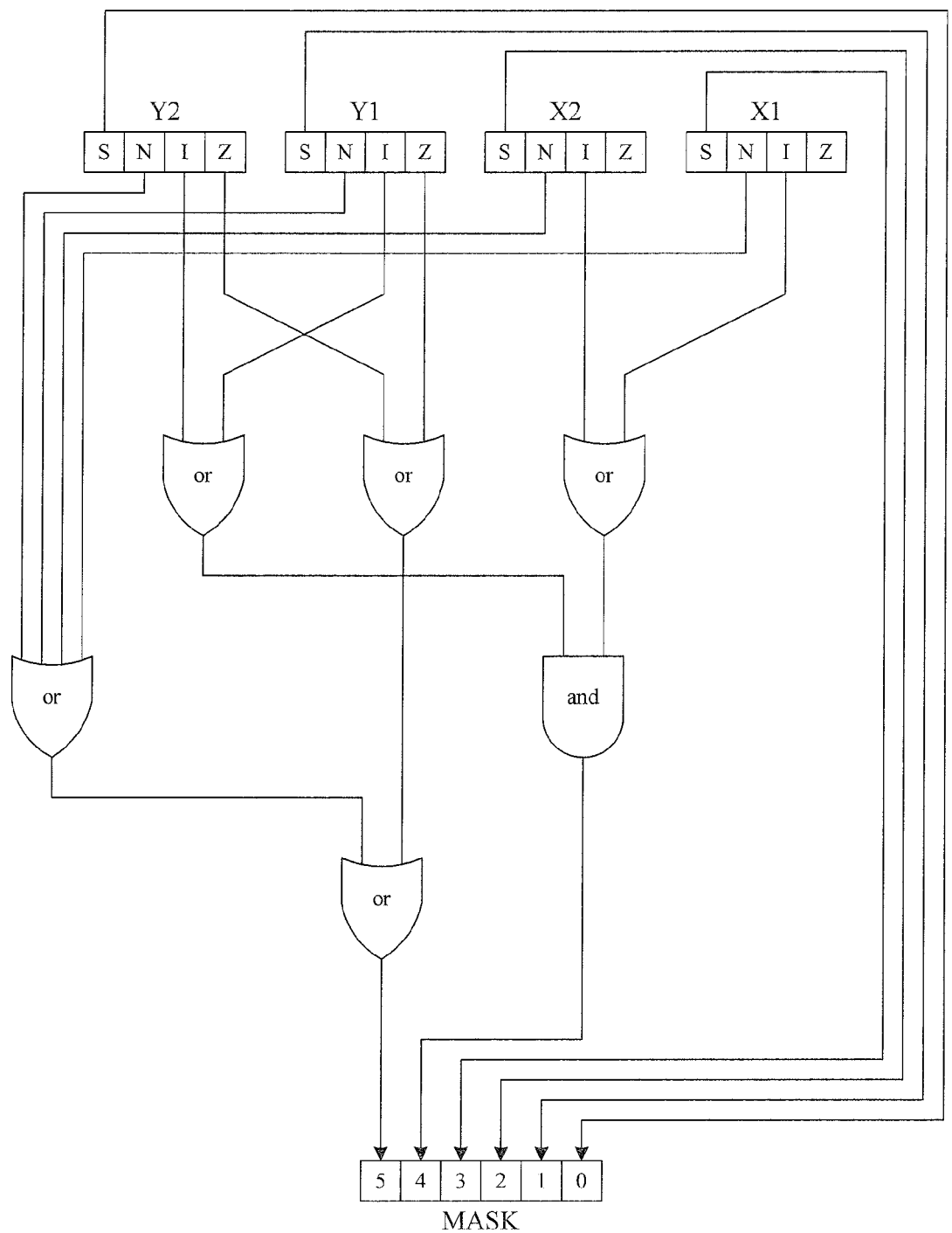
FIG. 6 depicts logic operations in furtherance of computing a 6-bit mask for modal interval division.

FIG. 6 is a table for a mask-driven modal interval multiplication operation. The computation of Z1 and Z2 depends on bits 0 to 3, a total of sixteen cases in all.

For case 0, Z1 is the result of arithmetic operation ↓(X1·Y1) and Z2 is the result of arithmetic operation ↑(X2·Y2).

For case 1, Z1 is the result of arithmetic operation ↓(X1·Y1) and Z2 is the result of arithmetic operation ↑(X1·Y2).

For case 2, Z1 is the result of arithmetic operation ↓(X2·Y1) and Z2 is the result of arithmetic operation ↑(X2·Y2).

For case 3, Z1 is the result of arithmetic operation ↓(X2·Y1) and Z2 is the result of arithmetic operation ↑(X1·Y2).

For case 4, Z1 is the result of arithmetic operation ↓(X1·Y1) and Z2 is the result of arithmetic operation ↑(X2·Y1)

For case 5, Z1 is the result of arithmetic operation max(↓(X2·Y2), ↓(X1·Y1)) and Z2 is the result of arithmetic operation min(↑(X2·Y1, ↑(X1Y2)).

For case 6, Z1 is +0 and Z2 is −0.

For case 7, Z1 is the result of arithmetic operation ↓(X2·Y2) and Z2 is the result of arithmetic operation ↑(X1·Y2).

For case 8, Z1 is the result of arithmetic operation ↓(X1·Y2) and Z2 is the result of arithmetic operation ↑(X2·Y2).

For case 9, Z1 is −0 and Z2 is +0.

For case 10, Z1 is the result of arithmetic operation min(↓(X1·Y2), ↓(X2·Y1)) and Z2 is the result of arithmetic operation max(↑(X1·Y1), ↑(X2·Y2)).

For case 11, Z1 is the result of arithmetic operation ↓(X2·Y1) and Z2 is the result of arithmetic operation ↑(X1·Y1).

For case 12, Z1 is the result of arithmetic operation ↓(X1·Y2) and Z2 is the result of arithmetic operation ↑(X2·Y1).

For case 13, Z1 is the result of arithmetic operation ↓(X2·Y2) and Z2 is the result of arithmetic operation ↑(X2·Y1).

For case 14, Z1 the result of arithmetic operation ↓(X1·Y2) and Z2 is the result of arithmetic operation ↑(X1·Y1).

For case 15, Z1 is the result of arithmetic operation ↓(X2·Y2) and Z2 is the result of arithmetic operation ↑(X1·Y1).

FIG. 7 is a table for a mask-driven modal interval division operation. The computation of Z1 and Z2 depends on bits 0 to 3, a total of sixteen cases in all.

For case 0, Z1 is the result of arithmetic operation ↓(X1/Y2) and Z2 is the result of arithmetic operation ↑(X2/Y1).

For case 3, Z1 is the result of arithmetic operation ↓(X2/Y2) and Z2 is the result of arithmetic operation ↑(X1/Y1).

For case 4, Z1 is the result of arithmetic operation ↓(X1/Y2) and Z2 is the result of arithmetic operation ↑(X2/Y2).

For case 7, Z1 is the result of arithmetic operation ↓(X2/Y1) and Z2 is the result of arithmetic operation ↑(X1/Y1).

For case 8, Z1 is the result of arithmetic operation ↓(X1/Y1) and Z2 is the result of arithmetic operation ↑(X2/Y1).

For case 11, Z1 is the result of arithmetic operation ↓(X2/Y2) and Z2 is the result of arithmetic operation ↑(X1/Y2).

For case 12, Z1 is the result of arithmetic operation ↓(X1/Y1) and Z2 is the result of arithmetic operation ↑(X2/Y2).

For case 15, Z1 is the result of arithmetic operation ↓(X2/Y1) and Z2 is the result of arithmetic operation ↑(X1/Y2).

For cases 1, 2, 5, 6, 9, 10, 13 and 14, Z1 and Z2 are both NaN.

Exceptional Condition

If bit 4 is one and bit 5 is zero, an exceptional arithmetical operation occurs; the ordered arrangement of bits 0 to 3 forms a binary representation of a number which represents one of sixteen possible cases of the exceptional arithmetical operation.

For each case of the exceptional condition, a modal interval result comprised of a first mark, Z1, and a second mark, Z2, is defined. All cases are analogous to the unexceptional cases of each arithmetical operation, but with the following exceptions.

As described in applicant's copending application entitled REPRESENTATION OF MODAL INTERVALS WITHIN A COMPUTER, it is a fortunate coincidence that arithmetical operations on the endpoints of unbounded modal intervals can be calculated properly using the IEEE arithmetic for any combination of marks that is not an invalid operation. In all other cases, hardware conforming to IEEE standard 754 will return a NaN. To avoid such an invalid operation, special instruction must return the proper result and not the NaN returned by the IEEE arithmetic. The present invention considers the correct handling of these semantics so as to avoid generating an unwanted NaN in the final result.

If bit 4 is one, the potential for such an exceptional condition has been detected, that is, the modal interval operands X and Y contain a combination of marks that may cause an invalid operation.

Using a division operation as an example, the mask 010000 represents exceptional condition, case 0. The modal interval result of this case is a Z1 of $\downarrow(X1/Y2)$ and a Z2 of $\uparrow(X2/Y1)$. If X=[+∞,3] and Y=[+∞,7], then the arithmetical operations $\downarrow(+\infty/7)$ and $\uparrow(3/+\infty)$ are not invalid, and special instruction is not needed. However, if Y=[7,+∞], the arithmetical operations $\downarrow(+\infty/+\infty)$ and $\uparrow(3/7)$ contain an invalid operation, namely $\downarrow(+\infty/+\infty)$. In this case, special instruction must return the result +1 for the invalid operation.

Using a multiplication operation as a second example, the mask 010000 represents exceptional condition, case 0. The modal interval result of this case is a Z1 of $\downarrow(X1\cdot Y1)$ and a Z2 of $\uparrow(X2\cdot Y2)$. If X=[+∞,3] and Y=[+,+0], then the arithmetical operations $\downarrow((+\infty)(+\infty))$ and $\uparrow((3)(+0))$ are not invalid, and special instruction is not needed. However, if Y=[+0,+∞], the arithmetical operations $\downarrow((+\infty)(+0))$ and $\uparrow((3)(+\infty))$ contain an invalid operation, namely $\downarrow((+\infty)(+0))$. In this case, special instruction must return the result +0 for the invalid operation.

Using an addition operation as a third example, the mask 010011 represents exceptional condition, case 3. The modal interval result of this case is a Z1 of $\downarrow(X1+Y1)$ and a Z2 of $\uparrow(X2+Y2)$. If X=[+∞,3] and Y=[−2,−∞], then the arithmetical operations $\downarrow((+\infty)+(-2))$ and $\uparrow(3+(-\infty))$ are not invalid, and special instruction is not needed. However, if Y=[−∞,−2], the arithmetical operations $\downarrow((+\infty)+(-\infty))$ and $\uparrow(3+(-2))$ contain an invalid operation, namely $\downarrow((+\infty)+(-\infty))$. In this case, special instruction must return the result +0 for the invalid operation.

A complete list of all possible invalid operations is given in applicant's copending application entitled REPRESENTATION OF MODAL INTERVALS WITHIN A COMPUTER, as is the correct result that a special instruction must return. When creating the 6-bit mask for each arithmetical operation, the present invention, as described, ensures that no combination of operands which might possibly generate an invalid operation will be missed (by setting bit 4 to one). This is, however, a conservative guarantee. As the previous examples show, special instruction may not always be needed.

As such, when the presence of an exceptional condition is detected via bit 4, and when Z1 and Z2 are computed, each arithmetic operation performed on the operands of Z1 and Z2 is examined. If an invalid operation is detected, special instruction is given; otherwise the arithmetical operation is computed as usual.

FIG. 8 represents a procedure to determine if special instruction must be performed for addition. A and B are aliases for two marks that are operands of Z1 or Z2. If the I flags of A and B pass through an AND gate to result in a signal of zero, the arithmetical operation A+B will not result in an invalid operation and the result can be properly computed with IEEE arithmetic; otherwise special instruction might still be necessary. If the S flags of A and B pass through an XOR gate to result in a signal of zero, the arithmetical operation A+B represents addition of two same-signed infinities, which will not result in an invalid operation. In this case, again, the result can be properly computed with IEEE arithmetic; otherwise special instruction must return +0, as the arithmetical operation A+B represents addition of two opposite-signed infinites, which is an invalid operation.

FIG. 9 represents a procedure to determine if special instruction must be performed for subtraction. A and B are aliases for two marks that are operands of Z1 or Z2. If the I flags of A and B pass through an AND gate to result in a signal of zero, the arithmetical operation A-B will not result in an invalid operation and the result can be properly computed with IEEE arithmetic; otherwise special instruction might still be necessary. If the S flags of A and B pass through an XOR gate to result in a signal of one, the arithmetical operation A-B represents subtraction of two opposite-signed infinities, which will not result in an invalid operation. In this case, again, the result can be properly computed with IEEE arithmetic; otherwise special instruction must return +0, as the arithmetical operation A-B represents subtraction of two same-signed infinites, which is an invalid operation.

Figure 10:
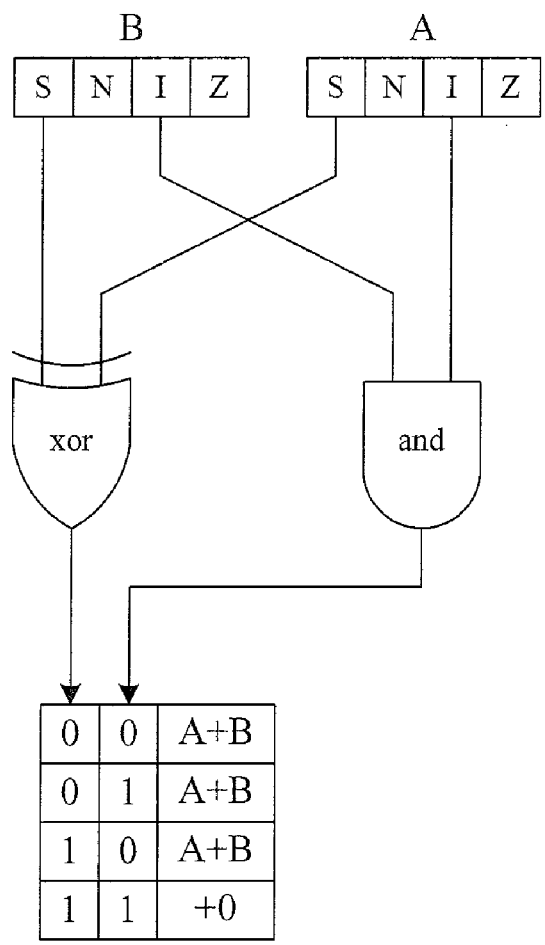
FIG. 10 depicts logic operations in furtherance of computing special instruction for unbounded addition.

FIG. 10 represents a procedure to determine if special instruction must be performed for multiplication. A and B are aliases for any two marks that are operands of Z1 or Z2. The I flag of A and the Z flag of B pass through an AND gate to produce a first intermediate result. The I flag of B and the Z flag of A pass through an AND gate to produce a second intermediate result. The signals of the first and second intermediate results pass through an OR gate to produce a final result. If the signal of the final result is zero, the arithmetical operation (A) (B) will not result in an invalid operation and the result can be properly computed with IEEE arithmetic; otherwise special instruction must return ±0. The sign of the result is computed as the XOR of the S flag of A and B, that is, the result is positive if the signal of the XOR is zero; otherwise the result is negative.

Figure 11:
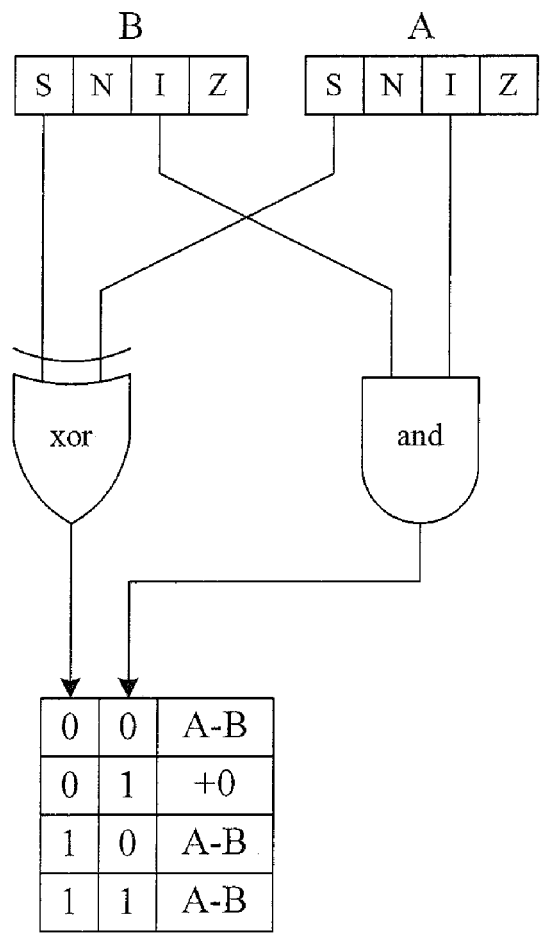
FIG. 11 depicts logic operations in furtherance of computing special instruction for unbounded subtraction.

FIG. 11 represents a procedure to determine if special instruction must be performed for division. A and B are aliases for two marks that are operands of Z1 or Z2. If the I flags of A and B pass through an AND gate to result in a signal of zero, the arithmetical operation A/B will not result in an invalid operation and the result can be properly computed with IEEE arithmetic; otherwise special instruction must return ±1. The sign of the result is computed as the XOR of the S flag of A and B, that is, the result is positive if the signal of the XOR is zero; otherwise the result is negative.

In summary, since the vast majority of modal interval arithmetical operations performed in typical calculations result in an unexceptional condition, it is undesirable to waste computational time and resources to test for invalid operations all the time. The present invention avoids this undesirable situation by conservatively detecting the presence of an exceptional condition in bit 4 of the 6-bit mask. This allows the implementation to perform the extra computational effort associated with special instruction only in the few cases where it may actually be required.

Indefinite Condition

If bit 5 is one (regardless of bit 4), an indefinite arithmetical operation occurs. This happens when at least one of the modal interval operands X or Y is indefinite, or when Y contains a zero and the arithmetical operation is division. For any indefinite arithmetical operation, the result is always an indefinite modal interval, that is, both Z1 and Z2 are NaN. An indefinite condition always exists if bit 5 is one, regardless of whether bit 4 is zero or one.

CONCLUSION

In-as-much as the preferred embodiment of each arithmetical operation in the present invention is an AFU in a modal interval processor, that is, an integrated circuit, it need not be so limited. For example, and without limitation, the present invention lends itself conveniently to a software implementation which uses existing computing devices, particularly a processor that supports or emulates IEEE floating-point arithmetic.

Figure 12:
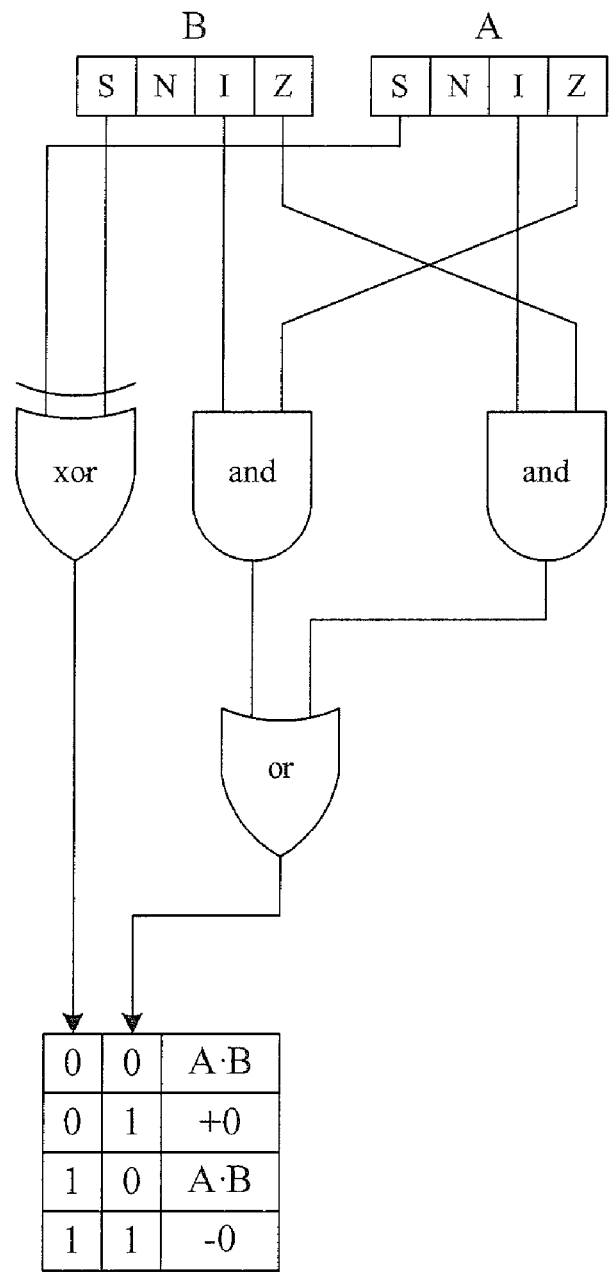
FIG. 12 depicts logic operations in furtherance of computing special instruction for unbounded multiplication.

As an example, FIG. 12 is a software program to efficiently compute the S, N, I and Z flags of a 32-bit IEEE floating-point number on a general-purpose Intel processor; the software emulates the procedure described in FIG. 1.

Figure 13:
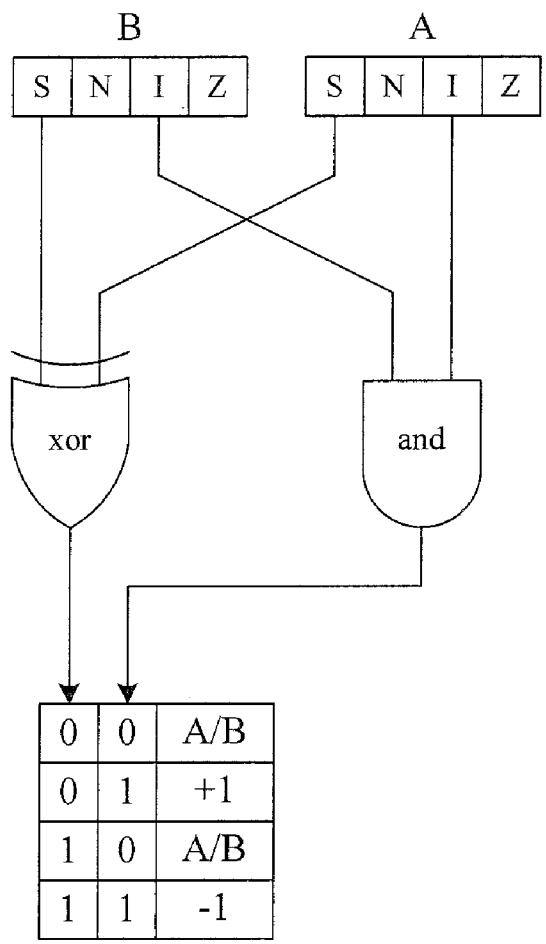
FIG. 13 depicts logic operations in furtherance of computing special instruction for unbounded division.
Figure 17:
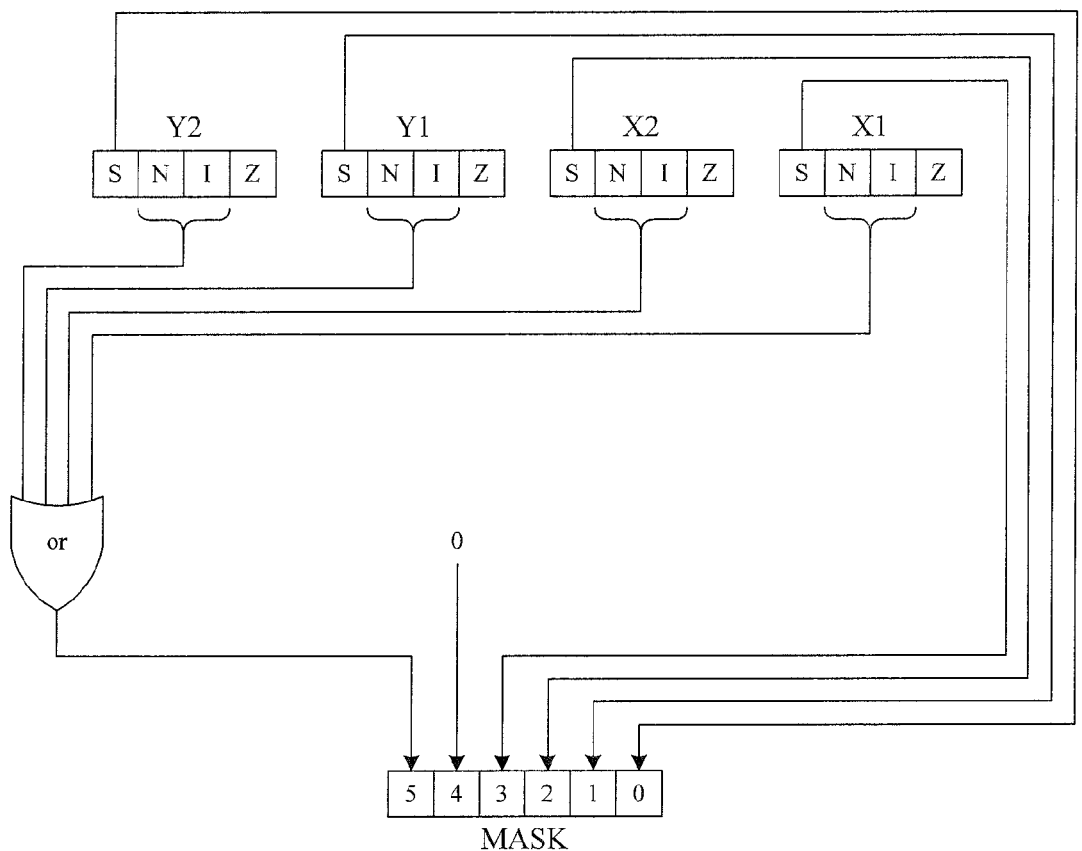
FIG. 17 depicts logic operations in furtherance of computing a 6-bit mask for "simple" modal interval addition, subtraction and multiplication; and, FIG. 18 depicts logic operations in furtherance of computing a 6-bit mask for "simple" modal interval division.
Figure 18:
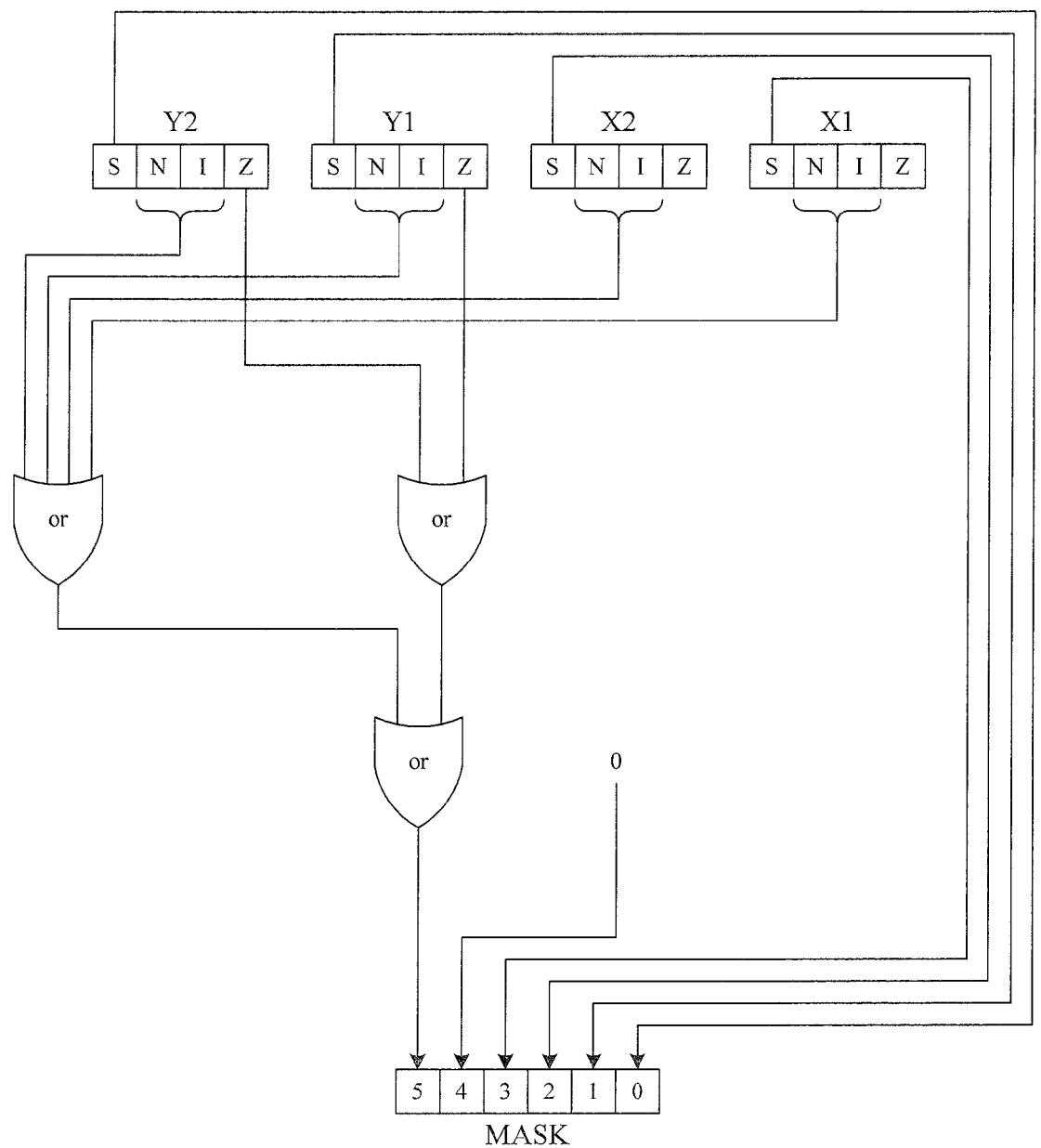

As a second example, FIG. 13 is a software program to efficiently compute a 6-bit mask for a modal interval multiplication operation on a general-purpose Intel processor; the software emulates the logic gates depicted in FIG. 3.

As a third example, FIG. 14 is a software program to efficiently compute a 6-bit mask for a modal interval division operation on a general-purpose Intel processor; the software emulates the logic gates depicted in FIG. 4.

The present invention can also be "simplified" to provide backwards compatibility with existing modal interval representations that do not support unbounded modal intervals. As an example, FIG. 15 is a simplified logic diagram for creating a 6-bit mask for addition, subtraction and multiplication, and FIG. 16 is a simplified logic diagram for creating a 6-bit mask for division. In both figures, all logic gates relating to the computation of bit 4 are eliminated and the computation of bit 5 treats infinity as a special case of NaN. The result is a 6-bit mask which will operate properly with the present invention on a modal interval representation that supports only the bounded modal intervals.

There are other variations of this invention which will become obvious to those skilled in the art. It will be understood that this disclosure, in many respects, is only illustrative. Although the various aspects of the present invention have been described with respect to various preferred embodiments thereof, it will be understood that the invention is entitled to protection within the full scope of the appended claims.

What is claimed is:

1. A computer executable method embodied in an arithmetic functional hardware unit of a modal interval processor for performing a modal interval arithmetic operation utilizing representations of first and second modal interval operands such that each modal interval operand of the modal interval operands is delimited by first and second marks of a digital scale, each mark of the marks comprising a bit-pattern, the method comprising:
   a. constructing a bit-mask based upon each bit-pattern of the marks of the modal interval operands wherein a presence or absence of an exceptional arithmetic condition is represented by a bit of bits of said bit mask, and a presence or absence of an indefinite operand or division by zero is represented by another bit of bits of said bit mask;
   b. detecting a presence of an exceptional arithmetic condition, or an indefinite arithmetic operation associated with the constructed bit-mask; and thereafter,
   c. separately and selectively addressing the detected exceptional arithmetic condition, or indefinite operand or division by zero of said modal interval operation.

2. A system for reliable and efficient computing of modal interval arithmetic operations on first and second modal intervals wherein each modal interval of the modal intervals is comprised of a set of marks, said system comprising an arithmetic functional unit having a select arrangement of logic gates to enable construction of a bit-mask based upon each bit-pattern of the marks of the set of marks of said modal interval, a first select bit of bits of said bit-mask representing a presence or absence of an exceptional arithmetic condition, a second select bit of bits of said bit-mask representing a presence or absence of an indefinite operand or division by zero, wherein for each case of exceptional arithmetic condition detected, said arithmetic functional unit performs a modal interval arithmetic operation predicated on said bit-mask such that upon detection on an invalid operation, special instruction is given and said arithmetic functional unit returns a modal interval result comprised of first and second result marks.

3. The system of claim 2 wherein said bit-mask facilitates modal interval addition and subtraction.

4. The system of claim 3 wherein said special instruction returns a positive zero.

5. The system of claim 2 wherein said bit-mask facilitates modal interval multiplication.

6. The system of claim 5 wherein said special instruction returns a signed zero.

7. The system of claim 2 wherein said bit-mask facilitates modal interval division.

8. The system of claim 7 wherein said special instruction returns a signed one.

9. A computer executable method, embodied in an arithmetic functional hardware unit of a modal interval processor, to set status flag states of status flags comprising Sign (S), NaN (N), Infinity (I) and Zero (Z) flags as a preliminary step in performing a modal interval arithmetic operation utilizing representations of first and second modal interval operands wherein each modal interval operand of the modal interval operands is delimited by first and second marks of a digital scale, each mark of the marks comprising a bit-pattern characterized by bits, bits of a mark of each of the marks grouped into sign, exponent and fraction bit fields, said method comprising:
   a. copying a sign bit corresponding to the sign bit field to the Sign (S) status flag of the status flags;
   b. ascertaining a boolean condition of whether all bits of bits of combined exponent and fraction bit fields are zero and setting the Zero (Z) status flag of the status flags to represent the ascertained boolean condition;
   c. ascertaining a boolean condition of whether said all bits of bits of combined exponent and fraction bit fields are equal to a bit pattern of infinity and setting the Infinity (I) status flag of the status flags to represent the ascertained boolean condition; and,
   d. ascertaining a boolean condition of whether a magnitude of said all bits of bits of combined exponent and fraction bit fields are greater than said bit pattern of infinity and setting the NaN (N) status flag of the status flags to represent the ascertained boolean condition.

* * * * *